United States Patent [19]

Gach et al.

[11] Patent Number: 4,912,632
[45] Date of Patent: Mar. 27, 1990

[54] MEMORY CONTROL SUBSYSTEM

[75] Inventors: Alain Gach; Yves Hartmann, both of Vence; Michel Peyronnenc, St. Jeannet, all of France

[73] Assignee: International Business Machines Corp., Armonk, N.Y.

[21] Appl. No.: 176,122

[22] Filed: Mar. 31, 1988

[30] Foreign Application Priority Data

Apr. 22, 1987 [EP] European Pat. Off. ........... 87430014

[51] Int. Cl.⁴ ............................................. G06F 12/00
[52] U.S. Cl. ................................. 364/200; 364/238.4; 364/242.3; 364/242.31; 364/243.4; 364/243.41
[58] Field of Search ........................ 364/200, 300, 900

[56] References Cited

U.S. PATENT DOCUMENTS 4,590,551 5/1986 Mathews ............................ 364/200
4,598,362 7/1986 Kinjo et al. ........................ 364/200
4,669,043 5/1987 Kaplinsky ........................... 364/200

FOREIGN PATENT DOCUMENTS 0009678 12/1979 European Pat. Off. .
0090575 3/1983 European Pat. Off. .

OTHER PUBLICATIONS

WO-A-8102210 Digital Equipment Corp., Abstract, p. 10, line 24–p. 11, line 17.

Primary Examiner—Raulfe B. Zache
Attorney, Agent, or Firm—Edward H. Duffield

[57] ABSTRACT

The memory control subsystem controls and arbitrates access to a memory shared by a plurality of users. A processor with its cache and input/output devices has direct access to the memory through a direct memory access bus.

The controls subsystem comprises a processor controller, a DMA controller and a memory controller.

A processor request is buffered into the processor controller and is serviced immediately if the memory controller is available. A simultaneous transfer between the devices and buffers in the DMA controller is possible. If the memory controller is busy, the DMA controller causes the DMA transfer to be interrupted, the processor request to be serviced and the DMA transfer to be resumed afterwards.

Write requests made by the processor are buffered into processor controller and an acknowledgement signal is sent to the processor which can resume execution without waiting the memory update completion. A read request which does not hit the cache is sent to the processor controller which causes the cache to be updated.

In case of multiple processor requests contending with a long DMA transfer, the latter is sliced into several parts, each part mapping one cache line. In case of a DMA write, the cache lines which correspond to memory positions whose content is modified by the write operation are invalidated in such a way that the processor cannot read a partially written line into the cache.

9 Claims, 5 Drawing Sheets

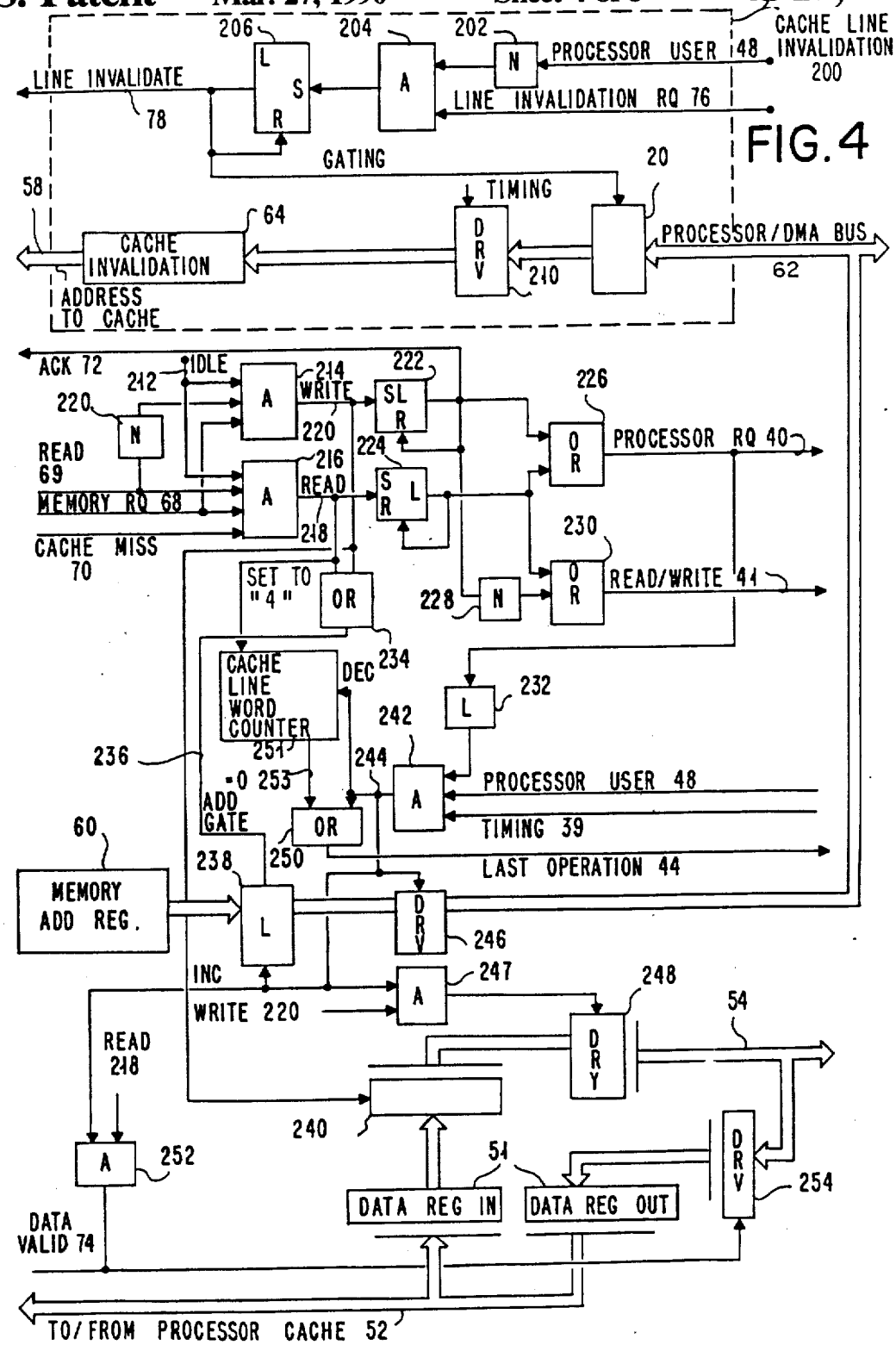

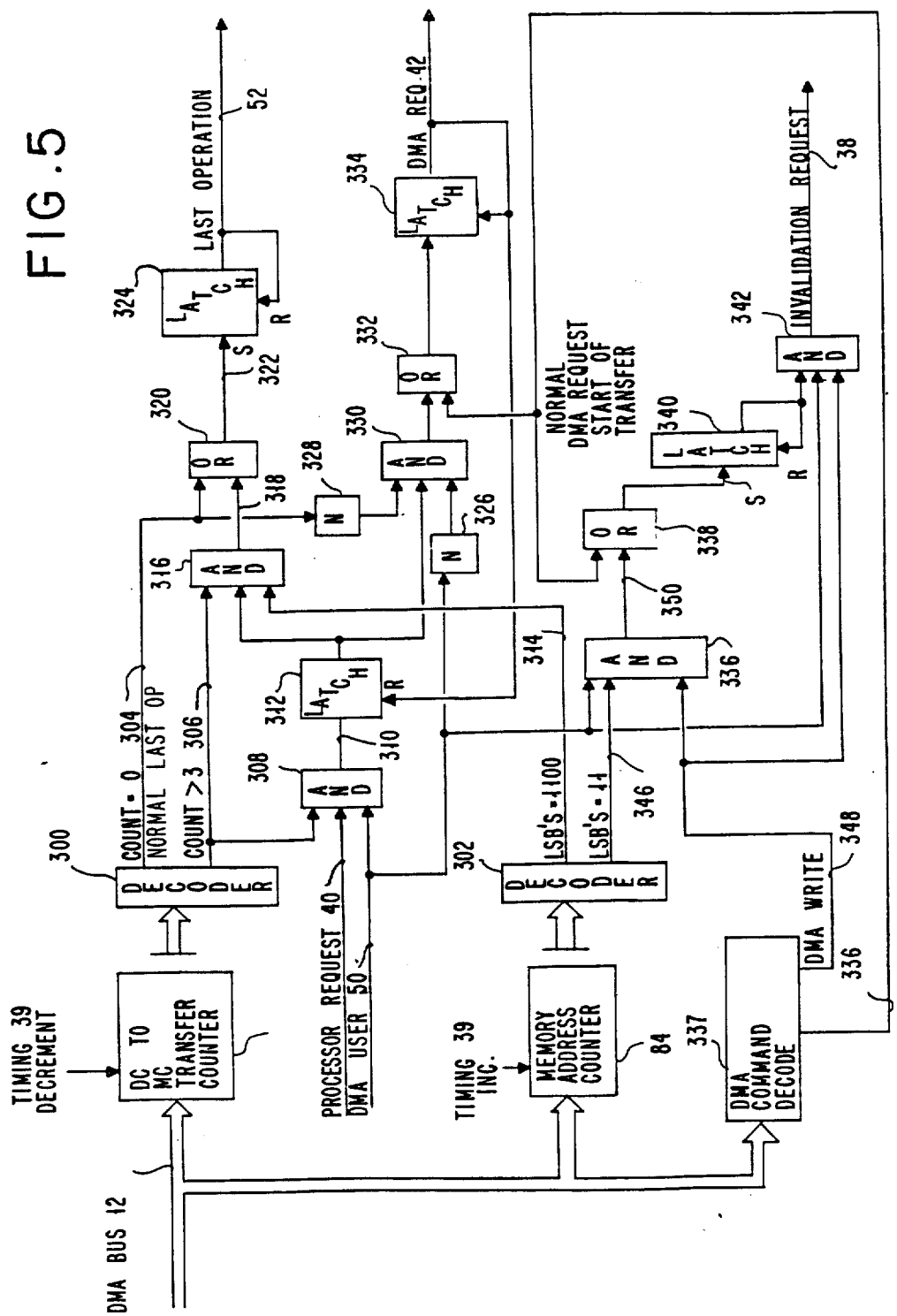

MEMORY CONTROL SUBSYSTEM

DESCRIPTION OF THE INVENTION

1. Field of the Invention

This invention relates to a memory control subsystem for arbitrating and controlling the access to a multi-port memory which is shared by a plurality of users comprising at least one processor with its cache and units having direct access to the memory.

2. Background Art

The present invention is to be incorporated in a system wherein a memory is shared by a plurality of users, namely a special or multi-purpose processor, its cache and a direct memory access DMA bus on which high speed input/output I/O devices such as adapters, are connected. It can be extended to a multi-processor, multi-DMA bus memory subsystem.

In such an environment, a conventional multi-port memory control subsystem may be of two kinds, with respect to the processor/cache/DMA access arbitration.

First, if the I/O adapters transfer single words to/from the memory, the memory subsystem controller usually gives I/O adapters access to the memory through cycle steal operations. This method is only acceptable for small systems where only little I/O bandwidth is needed. Connecting more adapters to the DMA bus soon ends up in I/O adapters struggling for that bus and the processor slowed down below a reasonable limit. In the overall system, the memory subsystem controller becomes the bottleneck.

Second, if the I/O adapters transfer bursts of several words to/from the memory and if the I/O bandwidth must be maximized, the maximum burst length is increased to a fairly high value such as 128 or 256 bytes. This raises a priority problem. If priority is given to an I/O adapter for the duration of one burst transfer, the processor is stopped and has to wait for a tremendous amount of time before it can gain access to the memory.

On the other hand, giving priority to the processor limits the effective I/O bandwidth and response time which increases the risk of I/O overrun and once the I/O adapter is finally granted access to the memory, any new processor request still has to wait the same excessive amount of time. At his point, the system designer makes a trade off between I/O bandwidth and processor response time, such as reducing the allowable I/O burst length and implementing an alternate priority scheme between the I/O adapters and processor. While better than previous methods, this does not yet optimize the I/O bandwidth.

Furthermore, some processors lose time in controlling the cache, each time it must be loaded. In addition, logic circuitry must be added and more processor time wasted in controlling cache line invalidation, i.e. preserving coherency between the cache and memory contents.

OBJECTS OF THE INVENTION

An object of the present invention is to provide an improved and efficient and simple memory controller to be used in a system wherein a plurality of users share a common memory, said users comprising at least one processor with its cache and units such as input/output I/O adapters connected to the memory through at least one direct access memory bus.

Another object of the invention is to provide such an improved memory controller which ensures a short processor response time while allowing transfer of large bursts of data between the memory and the I/O adapters.

Another object of the invention is to provide such an improved memory controller wherein no processor time is wasted in cache housekeeping tasks.

Still another object of the invention is to provide such an improved memory controller which comprises means for preserving the memory/cache coherency.

Another object of the invention is to provide such an improved memory controller in which there is a maximum parallelism between the processor and I/O adapter operations.

BRIEF SUMMARY OF THE INVENTION

The memory control subsystem according to the present invention is to be used in a data handling system comprising a memory which may be accessed by a plurality of users comprising at least one processor with a cache storing means organized in cache lines storing at least one word of the memory content, said cache storing means providing a cache hit or cache miss control signal depending upon whether a processor request for a memoy access hits the cache storing means or not, and at least one direct memory access bus through which input/output devices which have direct access to the memory are connected, said users making requests to gain access to the memory.

The memory control subsystem comprises memory access controlling means, processor controlling means and direct access memory controlling means.

The memory access controlling means (24) are responsive to the user requests to grant access to the memory to a selected user and control the memory write or read operations requested by the selected user, The processor controlling means comprises:

memory write control means which are responsive to a memory request from the processor calling for a write operation at a selected memory address to cause an acknowledgement signal to be sent to the processor so that the processor may resume its operation immediately, and the memory address and data relative to the memory request to be stacked so that the memory request may be serviced by the memory controlling means when available, memory read control means which are responsive to the memory requests from the processor calling for a read operation of a word at a selected memory address for which the cache miss control signal is active to cause the addresses of the words of the cache line comprising the addressed word to be buffered and sent to the memory controlling means when available and the data read from these addresses to be sent to the processor and to the cache storing means.

The direct access memory controlling means comprises:

data buffering means able to store data bursts from the input/output devices to be stored into the memory or from the memory to be sent to the input/output devices, through the DMA bus, said direct memory access controlling means generating a memory access request signal when the burst is ready to be transferred from the memory into the buffering means or when it is ready to be transferred from the buffering means into the memory, means which are responsive to the memory access requests from the processor to cause the memory transfer initiated by the direct memory access controlling means to be interrupted at a cache line boundary to service the processor request and resume the burst transfer afterwards, means for invalidating the cache lines corresponding to the memory addresses, the content of which are modified by memory write operations initiated by the direct memory access controlling means.

BRIEF DESCRIPTION OF THE FIGURES

FIG. 4 represents the processor controller PC 20 of FIG. 2.

FIG. 5 represents the direct memory access controller MC 22 of FIG. 2.

DETAILED DESCRIPTION OF THE INVENTION

Figure 1:
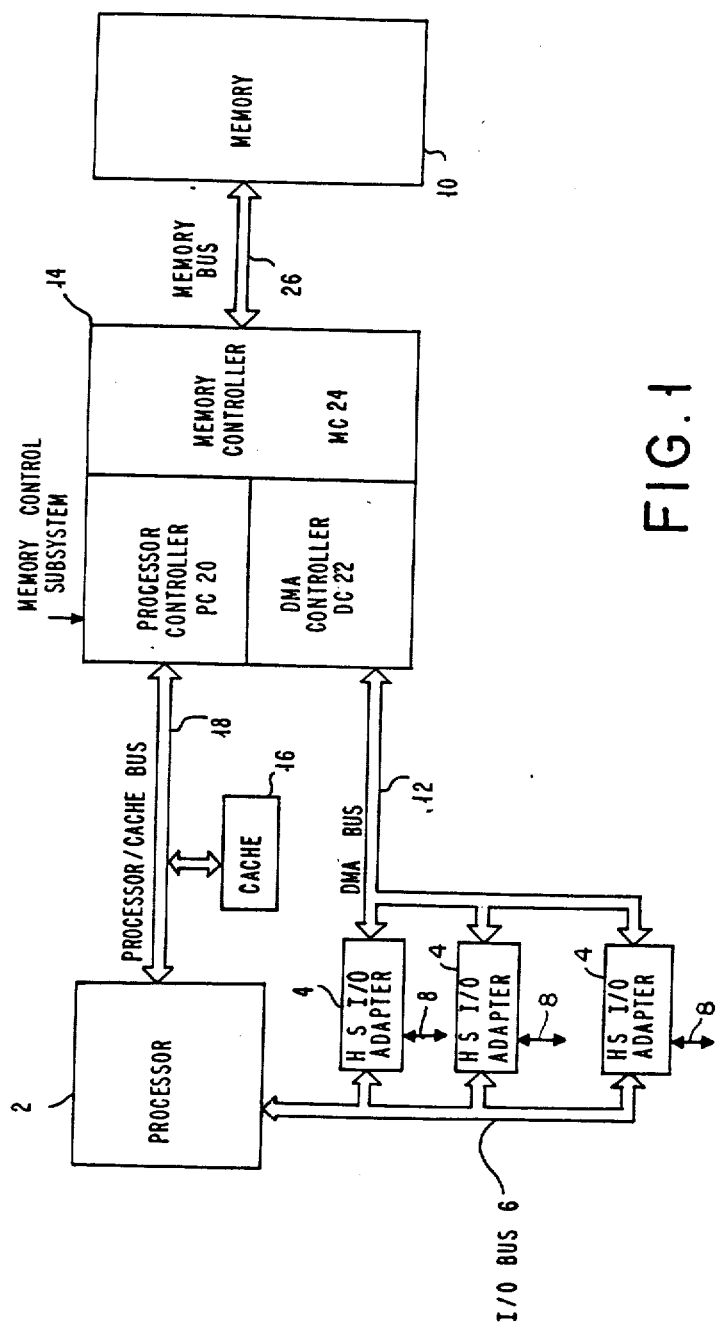
FIG. 1 represents the general arrangement of a system which may incorporate the present invention.

FIG. 1 shows the overall configuration of the system incorporating the present invention and shows the partitioning of the memory control subsystem according to the present invention in three functional units.

The processor 2 which may be the central control unit of a communication controller is attached to I/O adapters 4 through I/O bus 6. The I/O bus is used for exchanging control and address information between the processor and the adapters. The adapters are assumed to be high speed adapters which receive and transmit bits from/to high speed lines 8. The receive and transmit bit streams are stored into the system memory 10 through the direct memory access DMA bus 12. Once granted access to the bus, the adapters begin a transfer by presenting on the DMA bus the starting storage address together with the burst length.

The memory 10 can be of any type (static or dynamic). It is assumed to have a page mode facility in which contiguous words are accessed faster and to be four bytes (i.e. a word) wide, but any other configuration can be matched.

Accesses to the memory 10 are controlled by the memory control subsystem 14. As seen from the memory subsystem 14, the processor 2 accesses the memory with a variety of load and store instructions. The processor cache 16 can be fully or set associative, its lines are of N bytes. For the sake of simplicity it is assumed that N is equal to 16 i.e. four words. The cache may be of one of the two conventional types. If write requests are performed in both cache 16 and memory 10, the cache is a write thru cache. If the write requests are performed in cache 16 only and memory is updated at cache line replacement time, the cache is a write back cache.

The cache 16 and processor 2 are connected to the memory control subsystem through processor/cache bus 18.

As schematically shown in FIG. 1, the memory control subsystem is partitioned in three functional units, namely the processor controller PC 20, the DMA controller DC 22 and the memory controller MC 24. The arrangement of the three functional units of the memory control subsystem is shown in FIG. 2.

Figure 2:
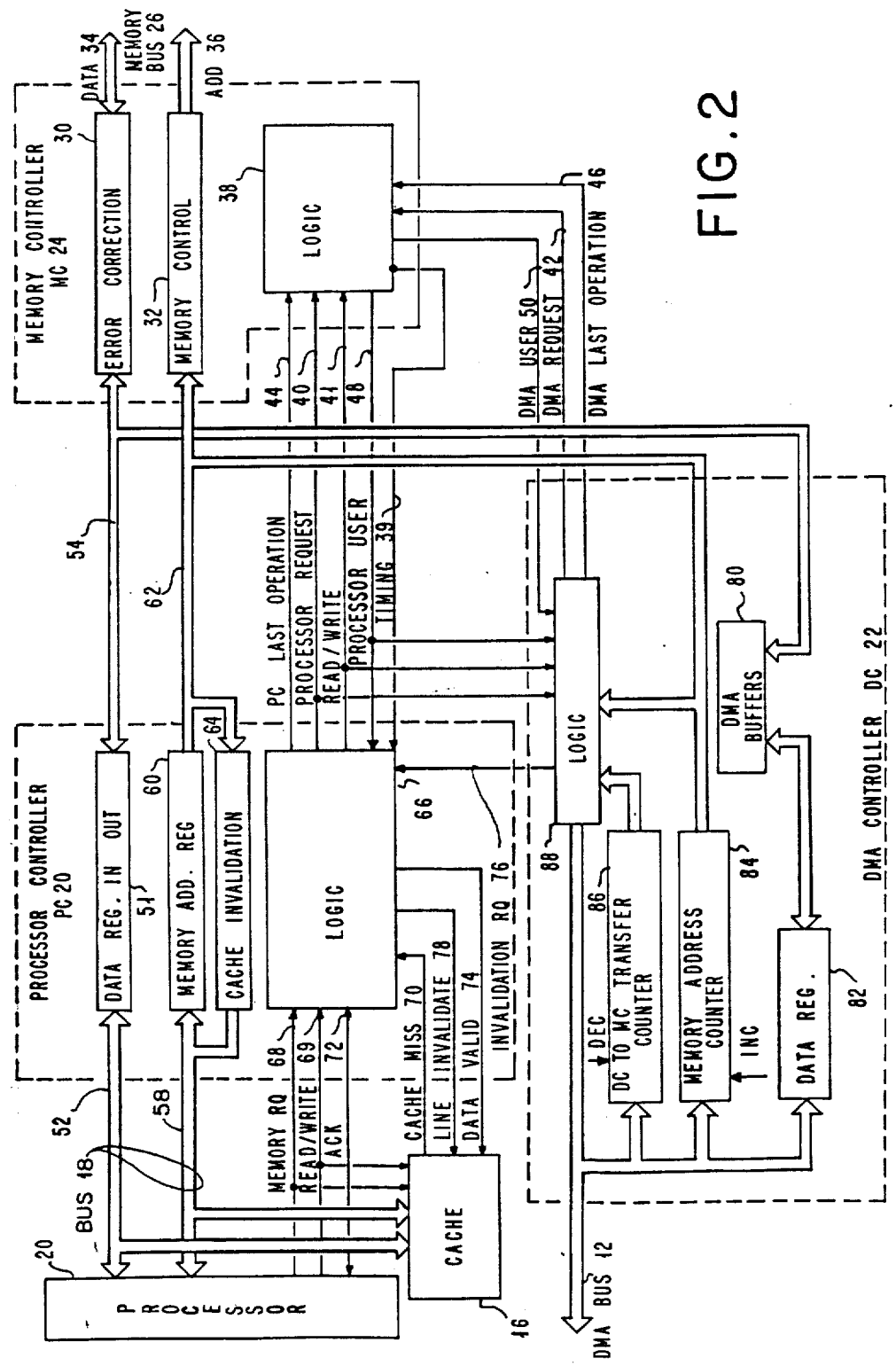
FIG. 2 represents the memory control subsystem in more details.

Before describing FIG. 2, the transmit and receive processes which may be implemented for transmitting and receiving data bit streams to and from a selected line connected to a selected adapter will be briefly described.

For example, a transmit operation which causes the transfer of a data burst from the processor to a selected adapter is initiated in the following way. The processor causes the data burst to be stored into memory 10 from a starting address. It sends a TRANSMIT command to the selected adapter through bus 6. The TRANSMIT command, starting address and burst length are sent by the selected adapter to DMA controller DC 22 through the DMA bus 12.

Then, DMA controller 22 causes the data burst to be transferred from memory 10 to DMA buffers in controller 22 and then to the selected adapter.

A receive operation which causes the transfer of a data burst received by an adapter to the memory is initiated in the following way. The processor sends a RECEIVE command to the selected adapter and then the starting address in the memory from which the data burst is to be stored, and the burst length. This information is sent to the DMA controller 22 and the data burst is stored into the DMA buffers. When the complete burst is received, it is transferred to memory 10.

Turning to FIG. 2, the memory controller 24 controls the access to the memory with the help of an error correction code mechanism 30 and a memory control circuit 32. The data which are to be written into or read from the memory are provided on data lines 34 of memory bus 26. The memory address is provided on address lines 36.

Logic circuit 38 receives and arbitrates the memory access requests from the processor controller 20 and DMA controller 22 and generates timing signals on bus 39 to control the sequence of operations to be performed by processor controller 20 and DMA controller 22. Bus 39 comprises a plurality of lines. A sequencer generates an active signal on one of the bus line to start a specific operation. In the drawing, only one line 39 is shown.

To do this, logic 38 receives the processor request signals on line 40 and the READ/WRITE control signal on line 41 from the processor controller 20, the DMA request signals on line 42 from the DMA controller 22, the processor LAST OPERATION signal on line 44 and the DMA LAST OPERATION signal on line 46.

It generates an active signal on processor user line 48 or on DMA user line 50 to grant access to the memory to one user. In case of conflicts, the DMA controller and the processor controller requests are serviced alternatively. If a plurality of processor users and DMA users are provided, a priority between the different users is established, so that one user request may be selected.

The one selected by the memory controller MC 24 to be the memory user, can request service as long as it wants until it relinquishes the memory by activating its LAST OPERATION line, as will be described later on.

The processor controller PC 20 comprises data register means 51 which stores the data to be written into or read from the memory. As schematically represented in FIG. 2, the data register means 51 are connected to processor 2 by the data lines 52 of the processor bus 18 and is connected to the error correction mechanism 30 through bus 54.

The memory addresses are provided by the processor through the address lines 58 of processor bus 18 to memory address register 60. The memory address is also provided to cache invalidation register 64 to cause a cache line to be invalidated in specific conditions as will be described later on.

Processor controller 20 comprises a logic arrangement 66, which receives the memory request signal on line 68 from processor 2. The data and address relative to a memory request may be stacked if the memory controller 24 is busy. When the processor requests an access to the memory, it sends a memory request signal on line 68, a READ/WRITE control signal on line 69 and the memory address which is to be accessed on lines 58. These signals and address are provided to the cache 16. In a preferred embodiment of the invention, a memory request from the processor causes one word, i.e. four bytes to be transferred between the processor and memory.

Logic circuit 66 in processor controller receives a cache MISS control signal on line 70 which is activated when a processor request address does not hit the cache, which means that at that time the addressed position is not in the cache.

A write request, no matter if the cache MISS signal on line 70 is activated or not, is buffered, and an acknowledgement signal is sent by the processor controller 20 on ACK line 72, to the processor 2.

The effective write operation will take place when the memory controller 24 is available.

A READ request for which the cache MISS signal is not activated which corresponds to a READ HIT is simply discarded by processor controller PC 20 since in that case, the memory has not to be accessed.

A READ request for which the cache MISS signal is activated, is buffered. In that case, the processor controller 20 causes the missing line to be loaded into cache 16 with the help of DATA VALID tag on line 74.

Thus cache 16 is controlled by processor controller PC 20 and its operation is completely transparent to the processor 2.

Processor controller 20 stacks the cache invalidation requests sent by direct memory access controller 22 on line 76. Thus an invalidation control signal is used to cause the cache lines to be invalidated when a direct memory access operation is performed on memory positions which at the time are in cache 16. An invalidation is performed by processor controller 20 which sends the memory address to the cache 16 by means of register 64 while activating the LINE INVALIDATE tag on line 78. If the addressed line is in the cache, its corresponding cache directory entry is erased. If not, the operation has no effect, DMA controller DC 22 comprises DMA buffers 80, in which a DMA burst received from or to be sent on bus 12 through data register 82 can be temporarily stored. During the read or write data transfer between adapter 4 and the DMA buffers 80, memory controller is not involved and it can service the processor requests.

DMA controller DC 22 comprises a memory address counter 84 and a DC to MC transfer counter 86. Counter 84 is connected to DMA bus 12 and contains the memory address. Thus the memory address counter content is provided to memory control circuit 32 through bus 62. The data to be written into or read from the memory are sent from DMA buffers 80 or written into DMA buffers 80 through bus 54.

As can be seen in FIG. 2, processor controller PC 20 and DMA controller DC 22 share the same address bus 62 to the memory controller. Thus, during a DMA write operation, processor controller 20 can steal the address going from DMA controller 22 to memory controller 24 when requested by the INVALIDATION request on line 76, without any extra control, time lost or special protocol. This address sampling is completely transparent to the memory controller 24.

Logic circuit 88 receives the processor request signals on line 40, the DMA user signals on line 50 and the DMA write control signal from bus 12 and generates the DMA request signals on line 42, the DMA LAST OPERATION on line 46 and the INVALIDATION request signal on line 76.

The processor request line 40 is provided not only to the memory controller MC 24 but also to direct memory access controller 22. The DMA request from DMA controller on line 42 is provided to memory controller 24 which causes the processor request or DMA request to be selected and which causes a grant signal on PROCESSOR USER or DMA USER lines 48 or 50 to be activated.

During the DMA transfer i.e. the data transfer between the DMA buffers and memory 10 through the data paths shown in FIG. 2 and memory bus 26, DMA controller 22 makes use of a slicing facility.

As long as processor request line 40 is inactive, the DMA transfer goes on.

If a processor request shows up during the DMA transfer, DMA controller slices its buffer at the next cache line boundary. This is performed by activating the LAST OPERATION control line 46 when hitting the last word in the current cache line. For cache line comprising $N=16$ bytes, the least significant bits of the address of this word are equal to 1100 and for cache line of $N=32$ bytes, they are equal to 11100.

This has the effect of temporarily terminating the DMA transfer. However, when memory controller 24 begins servicing processor 2, which is sensed by monitoring the processor request line 40 which drops, DMA controller 22 activates its request line 42. Thus as soon as the processor request is serviced, memory controller 24 grants the DMA controller request. Thus DMA controller 22 resumes its burst transfer by starting reading or writing a new line. The least significant bits of the address of this new line are 0000 for $N=16$ bytes and 00000 for $N=32$ bytes.

Once again, if another processor request comes along, DMA controller 22 slices its burst at the next cache line boundary i.e. at the next occurrences of four least significant bits equal to 1100 for $N=16$ bytes or of five least significant bits equal to 11100 for $N=32$ bytes. i.e. at least four words transferred for $N=16$ and eight words transmitted for $N=32$.

Otherwise, the DMA transfer goes on until completed.

Figure 3:
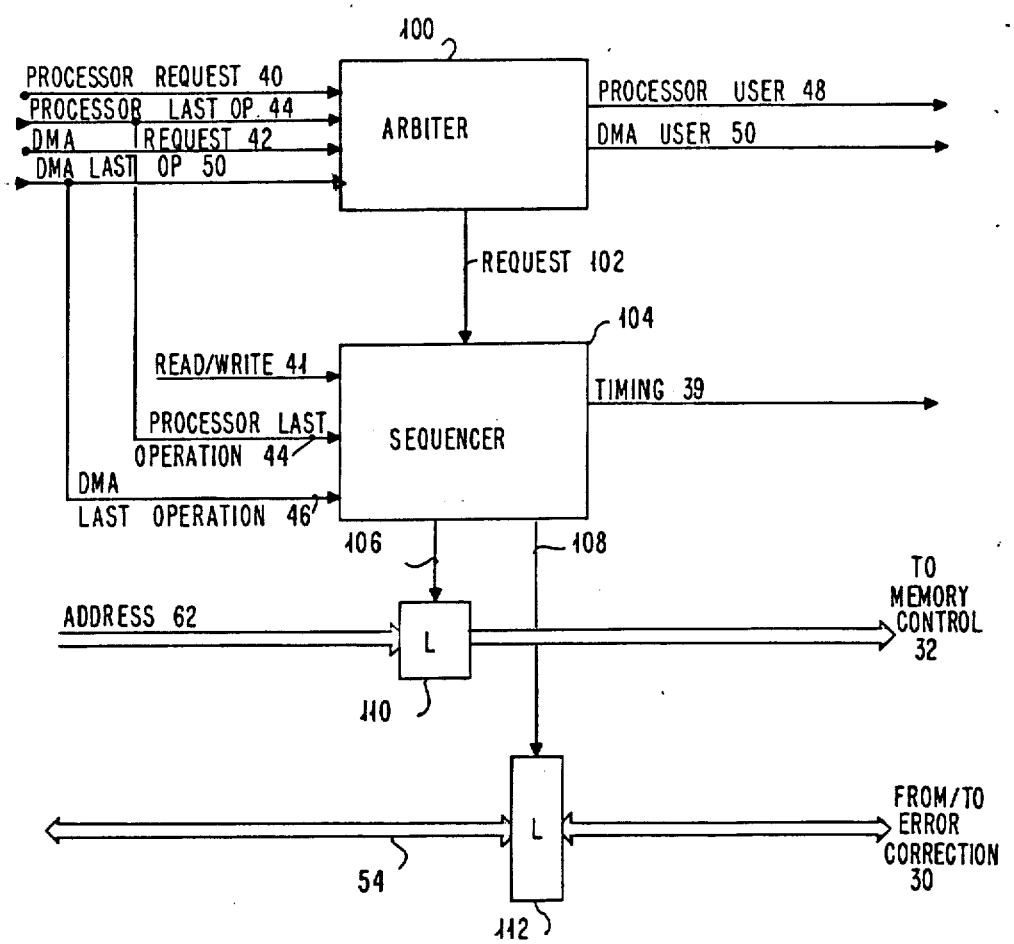
FIG. 3 represents the memory controller MC 24 of FIG. 2.

According to the present invention, the memory controller logic circuit 38, which is shown in FIG. 3, comprises an arbiter circuit 100 which receives the PROCESSOR REQUEST and DMA REQUEST signals on lines 40 and 42 and the PROCESSOR LAST OPERATION and DMA LAST OPERATION on lines 44 and 46 and provides an active PROCESSOR USER or DMA USER signal on line 48 or 50. In case of conflicts between two requests, the signal on line 48 or 50 becomes active alternatively, to service the processor controller and DMA controller alternatively.

As soon as a request signal appears on line 40 or 42, REQUEST line 102 is activates to start the operation of sequencer 104.

READ/WRITE control signal on line 41, PROCESSOR LAST OPERATION signal on line 44 and DMA LAST OPERATION signal on line 46 are provided to sequencer 104 which generates the timing signals on line 39 therefrom, to control the operations to be performed by logic circuits 66 and 88. It also generates active signals on lines 106 and 108 to control the gating into latch assemblies 110 and 112 of the address bits on bus 62 to be sent to memory control circuit 32 and of the data bits which are received from circuit 30 or to be sent to circuit 30.

Logic circuit 66 will now be described in reference to FIG. 4.

It comprises CACHE LINE INVALIDATION circuit 200 which generates the LINE INVALIDATE signal on line 78 and causes the address on the PROCESSOR/DMA bus 62 to be provided into CACHE INVALIDATION register 64.

Circuit 200 comprises inverter 202 which provides an active signal to one input of AND gate 204 when the PROCESSOR USER signal on line 48 is inactive. LINE INVALIDATION REQUEST line 76 is provided to the second input of AND gate 204.

When this line becomes active, latch 206 is set and provides an active signal on its LINE INVALIDATE output line 78. This signal is also provided to latch assembly 208, which stores the address bits on bus 62. The address bits are transferred into cache invalidation register 64 through drivers 210. Thus the memory address is provided to the cache directory (not shown) and if the addressed memory position is in the cache, the cache line is invalidated.

When processor controller is inactive, a signal on IDLE line 212 conditions AND gates 214 and 216. The MEMORY REQUEST signal on line 68 from processor 2 is provided to one input of AND gates 214 and 216.

READ/WRITE control signal on line 69 is provided to AND gate 216 together with the CACHE MISS signal on line 70. It is assumed that a READ/WRITE control signal at an UP level is a READ control signal. Thus when the memory request is a memory READ request, AND gate 216 provides an active READ signal on its output line 218.

Signal on line 69 is inverted in inverter 220, the output signal of which is provided to AND gate 214 which generates an active WRITE signal on line 220. The active signal on line 220 sets latch 222 which generates the ACKNOWLEDGEMENT signal on line 72, which is sent to processor 2.

The active READ signal on line 218 sets latch 224. The output signals of latches 222 and 224 are ORed in OR gate 226, which provides the PROCESSOR REQUEST signal on its output line 40 to logic circuit 38 of memory controller 24.

The output signal of latch 222 inverted by inverter 228 and the output signal of latch 224 are ORed in OR gate 230 which provides the READ/WRITE control signal on line 41 to logic circuit 38 of memory controller 24.

PROCESSOR REQUEST signal on line 40 is latched into latch 232.

The signals on lines 220 and 218 are ORed in OR gate 234, which provides an active signal on its output line 236 when a READ or a WRITE operation is requested by the processor. This signal causes the content of memory address register 60 to be stored into latch assembly 238.

If a WRITE operation is requested, the active signal on line 220 causes the content of data in register 51 (which contains the data to be written into memory 10) to be loaded into latch assembly 240.

The output signal of latch 232, the PROCESSOR USER signal on line 48 and a timing signal on line 39 which comes from sequencer 104 of memory controller 24, are provided to AND gate 242.

The active signal at the output line 244 of AND gate 242 is provided to drivers 246 which causes the address bits contained in latch assembly 238 to be provided on address bus 62 to memory controller 24.

The signal on line 244 is provided to AND gate 247 which is conditioned by the WRITE signal on line 220.

Thus, when a WRITE operation is requested, the active signal at the output of AND gate 247 causes the data bit contained in latch assembly 240 to be provided on data bus 54 to memory controller to perform the write operation.

The output signal on line 244 is provided to one input of OR gate 250, which generates an active output signal on its output line 44. This signal indicates that the WRITE operation is completed.

If a READ operation is requested, assuming that the CACHE MISS signal on line 70 is active, the missing line which is assumed to contain four memory words, is to be loaded into cache 16, with the help of DATA VALID tag on line 74.

In that case, four words have to be read from the memory and transferred to cache 16.

The loading operation is performed under the control of cache line word counter 251 which is set to "4" by the READ signal on line 218.

The timing signals on line 39 control the loading operation. The active output signals of AND gate 244 causes counter 251 to be decremented and the address value in latch assembly 238 to be incremented.

Thus, four words in the memory are successively addressed by sending the four word addresses on bus 62 through drivers 246. The data stored into the addressed memory locations are read and transferred from error correction circuit 30 on bus 54.

When the content of counter 251 becomes equal to 0, an active signal is generated on line 253. This signal is provided through OR circuit 250 to LAST OPERATION line 44.

AND gate 252 receives the output signal on line 244 and is conditioned by the READ signal from line 218, so as to provide an active signal which is applied to drivers 254. Thus, the data words which are read from memmory 10 are transferred from bus 54 into data out register 51 through drivers 254 to be sent on processor/cache bus 52. Each time a data word transfer occurs, the output signal from AND gate 254 is active. This signal is used as the DATA VALID tag which causes the data on bus 52 to be written into the cache.

Logic circuit 88 of DMA controller 22 will now be described in reference to FIG. 5.

Before the DMA burst transfers between DMA controller 22 and memory controller 24, the memory address register 84 is set to the value of the starting address in the memory which is assigned to the burst and the DC to MC transfer counter 86 is set the value of the burst length expressed in number of words to be transferred. This is done through the DMA exchange protocol on the DMA bus and is not described in details since this is not part of the present invention.

Then, once the DMA transfer is initiated, i.e. once DMA user line 50 from logic 38 (FIG. 2) is activated, the content of memory address counter 84 is incremented and the content of DC to MC counter 86 is decremented each time a word is transferred, thanks to a timing signal from line 39.

Decoders 300 and 302 decode the content of counters 86 and 84 respectively.

Decoder 300 provides an active signal on line 304 when the content of counter 86 is found equal to zero meaning that the DMA transfer is completed. This is the normal LAST OPERATION signal. It also provides an active signal on line 306 when the content of counter 86 is found higher than a threshold value, which in a preferred embodiment of the present invention is set equal to 3, meaning that more than three words are still to be transferred.

Line 306, PROCESSOR REQUEST line 40 and DMA USER line 50 are applied to AND gate 308, which thus provides an active signal on its output line 310 when a memory service request from the processor occurs in the case where more than three words have still to be transferred.

In that case, the processor request is to be serviced and the DMA transfer is to be interrupted. The active signal on line 310 sets latch 312.

At the address of the next cache line boundary, which is indicated by an active signal on output line 314 of decoder 302, AND gate 316 provides an active signal on line 318. This signal indicates that the DMA transfer is to be interrupted.

Lines 318 and 304 are applied to OR gate 320 which provides an active signal on line 322 to indicate a normal or temporary last operation. This signal sets latch 324 which provides on its output line 52 the DMA LAST OPERATION signal.

When the DMA transfer is to be interrupted, the memory controller desactivates the DMA USER line 50. Thus an active signal is provided by inverter 326 which inverts the DMA USER signal. The signal on line 304 which is not active at that time, since the content of counter is higher than 3, is inverted in inverter 328. The output lines of inverters 326 and 328 are provided together with the output line of latch 312 to AND gate 330. Thus, AND gate 330 provides an active signal which is transmitted through OR gate 332 to set latch 334. Latch 334 provides an active DMA request signal on line 42, which will be taken into account once the processor request is serviced.

The DMA controller is ready to restart the data burst transfer as soon as the DMA user line is activated again by memory controller 24 when the processor user data transfer is ended.

OR gate 332 receives on its second input, the normal DMA request signal on line 336, which is activated to initiate a transfer, i.e. when a TRANSMIT command is received from the processor through the adapter and DMA bus to initiate the transfer of a data burst from memory to DMA buffers or when a RECEIVE command is received from the processor through the adapter or DMA bus and when the data burst is stored into the DMA buffers 80. This signal is generated by DMA COMMAND DECODE circuit 337 which decodes the commands received from bus 12.

In logic 88, the line invalidation circuit comprises AND gates 336 and 342, OR gate 338 and latch 340.

The two least significant bits LSB of the first memory word address which is the burst starting address can be any of the four combinations 00, 01, 10, 11 but this word belongs to a line of the cache which must be invalidated.

The normal start of transfer signal on line 336 sets latch 340, through OR gate 338. The output signal of latch 340 is provided together with the DMA USER signal on line 50 to AND gate 342 which is conditioned by the DMA WRITE control signal on line 348 from decode circuit 337. and which provides an active INVALIDATION REQUEST signal on line 38, as soon as the first address is sent to memory controller.

From the second transfer to the last one, the INVALIDATION REQUEST line will be activated at each cache line boundary, which corresponds to LSB bits 11 of the word address. To do this, AND gate 336 is conditioned by an active signal provided on output line 346 of decoder 302 when the two LSB bits of the address are 11. The DMA WRITE control signal on line 348 and the DMA USER signal on line 50 are provided to AND gate 336. The output line 350 of AND gate 336 is provided to OR gate 338, to set latch 340 each time the LINE INVALIDATION REQUEST signal is to be activated.

It is to be noticed that if the two LSB bits of the first transfer word address are 10, the two LSB bits of the second transfer word address will be 11 and in that case two consecutive invalidations will be preformed.

Having thus described our invention with reference to a preferred embodiment thereof, what is desired to be protected by Letters Patent as set forth in the appended claims is intended by way of description and not limitation, in which, what is claimed is:

1. A memory control subsystem to be used in a data handling system comprising a memory (10) which may be accessed by a plurality of users comprising at least one processor (2) with a cache storing means (16) organized in cache lines storing at least one word of the content of memory (10), said cache storing means providing a cache hit or cache miss control signal depending upon whether a processor request for a memory access hits the cache storing means or not, and at least one direct memory access DMA bus (12) to which input/output devices which have direct access to the memory are connected, said users making requests to gain access to said memory, said memory control subsystem being characterized in that is comprises:

memory access controlling means (24) which are responsive to user requests to grant access to said memory to a selected user and which control the memory write or read operations by said selected user, processor controlling means (20) comprising memory write control means (216,214,222,238,240) which are responsive to a memory request from the processor calling for a write operation at a selected memory address to cause an acknowledgement signal to be sent to the processor, so that the processor may resume its operation immediately, and the memory address and data relative to the memory request to be stacked so that the memory request may be serviced by said memory access controlling means, when available, memory read control means (216,238,244,252,254) which are responsive to memory requests from the processor calling for a read operation of a word at a selected memory address for which the cache miss control signal is active, to cause addresses of words of said cache line comprising said addressed word to be buffered and sent to memory access controlling means, when available, and the data read from said addresses to be sent to said processor and to said cache storing means, direct memory access controlling means (22) comprising data buffering means (80) able to store data bursts from the input/output devices to be stored into the memory or data bursts from the memory to be sent to the input/output devices through said DMA bus, said direct memory access controlling means generating a memory access request signal when a data burst is ready to be transferred from the memory into the buffering means or when it is ready to be transferred from the buffering means into the memory, means (308,330,334,316,324) which are responsive to the memory access requests from the processor to cause a data burst transfer initiated by said direct memory access controlling means to be interrupted at a cache line boundary to service the processor request and resume said data burst transfer afterwards, means (336,340,342) for invalidating the cache lines corresponding to memory addresses, the content of which are modified by memory write operations initiated by said direct memory access controlling means.

2. A memory control subsystem according to claim 1 characterized in that the memory access controlling means comprises:

arbitrating means (100) having a plurality of inputs which receive requests from memory users and a plurality of outputs, said arbitrating means generating an active signal on one of the said outputs depending upon which memory user request is to be serviced, sequencing means (104) which are activated as soon as a request is made by one user to provide timing signals to the processor controlling means and to the direct memory access controlling means to control their sequence of operations.

3. A memory control subsystem according to claim 2 characterized in that the memory write control means comprises:

data register means (51) which receives from said processor data words to be written into the memory, address register means (60) which receives from said processor addresses where data words are to be written, write control logic means (214,222) which is responsive to the write memory request (68,69) from the processor to generate a write control signal and the acknowledgement signal which is sent to the processor, address storing means (238) which are activated by the write control signal to store said addresses for the address register means, data storing means (240) which are activated by the write control signal to store said data words for said data register means, write control gating means (242,246,247,248) which are responsive to the write control signal and to the timing signals to transfer said addresses and data words from said address storing means and said data storing means to said memory access controlling means when available, end of operation detecting means (244,250) which detects that said transfer of data words between said processor and said memory is completed, to provide a processor last operation signal indicative that said transfer of data words is completed.

4. A memory control subsystem according to claim 3 characterized in that the memory read control means comprises:

memory read control means (218,224,238) which are responsive to said read memory request and to the read miss control signal from said cache storing means, to generate a read control signal which causes the contents of said address register to be loaded into said address storing means read counting means (252) which are set by the read control signal to a value equal to the number of said data word in said lines of said cache storing means, word reading means (242) which are responsive to timing signals from the memory access controlling means and which generates a number of active signals equal to said number of data words in said lines of said cache storing means lines, each signal causing said address stored in said address storing means to be sent to said memory access controlling means and said data words read from said address to be transferred to said processor through said data register means, the count of said read counting means to be changed by 1, and said address storing means contents to be incremented until a number of data words equal to said number of data words in said cache storing means lines is read from said memory and stored in said cache storing means, end of read operation detecting means (253,250) which are responsive to the read counting means to generate a signal which is indicative that the last operation of said processor has occurred when the said number of data words has been transferred.

5. Memory control subsystem according to claims 2 or 3 or 4 characterized in that the direct memory access controlling means comprises:

burst transfer counting means (86) connected to said direct access memory bus for storing said number of data words comprising a data burst to be transferred during a direct memory access operation, memory address counting means (84) connected to said direct memory access bus for storing said starting address in said memory which is assigned to said data burst, the content of said address counting means being changed by 1 each time a data word from said data burst is transferred to or from said memory, direct memory access interrupting means (308,312,316) which are active when a direct memory access request is being serviced by the memory access controlling means and when the count in said memory address counting means is different from a given threshold, said means being responsive to a memory access request from said processor(s) cause said direct memory access data word transfer to be interrupted by generating a DMA end of operation signal indicative of a last operation made by the direct memory access controlling means, and said processor request to be serviced by said memory access controlling means, transfer resuming control means (330,332) which are responsive to the DMA grant signal (50) from said memory access controlling means to cause a DMA request to be raised and sent to said memory access controlling means so that said DMA transfer of data words may be resumed once said processor request has been serviced.

6. Memory control subsystem according to claim 4 characterized in that the direct memory access controlling means comprises end of transfer detecting means (300) which are responsive to the count in said data burst transfer counting means to generate a signal indicative of the end of said data burst transfer.

7. Memory control subsystem according to claims 4 or 6 characterized in that said direct memory access controlling means comprises:

decoding means (302) which are responsive to the count in said memory address counting means for generating an active signal at the boundary of a cache line, said signal being provided to the said direct memory access interrupting means and causing said DMA end of operation signal to be activated at the boundary of a cache line.

8. Memory control subsystem according to the claims 4 or 6 characterized in that the direct memory access controlling means comprises:

line invalidating means (340) which detects said starting of transfer of said DMA data burst to be stored into said memory, to cause an invalidation request signal to be sent to said processor controlling means, and said memory address counting means contents to be sent to said processor controlling means which causes the cache line comprising said addressed word to be invalidated in the cache, decoding means (302,314) which are responsive to the count of said memory address counting means which generates an active signal at said cache line boundaries to cause invalidation request signals and the count of said memory address counting means to be sent to said processor controlling means to invalidate each cache line which is modified by said direct memory access transfer.

9. A memory control subsystem according to claim 8 characterized in that the processor controlling means comprises invalidation control means (200) which are responsive to the invalidation request signal and which are active when a direct memory access request is being serviced by the memory access controlling means to cause the count of said memory address counting means to be sent to said cache together with said line invalidation request signal.

* * * * *